United States Patent Office 3,106,486
Patented Oct. 8, 1963

3,106,486
COATED ARTICLES AND PROCESS OF
PREPARING THEM
Richard E. Harren, Levittown, and Benjamin B. Kine,
Elkins Park, Pa., assignors to Rohm & Haas Company,
Philadelphia, Pa., a corporation of Delaware
No Drawing. Filed Sept. 27, 1960, Ser. No. 58,653
15 Claims. (Cl. 117—123)

This invention relates to coated articles, including hydraulic cement products, especially to asbestos-cement products and to a method of preparing the same and especially to a permanently thermoplastic coating which needs no baking for proper application.

It is known to apply aqueous dispersions of various synthetic addition polymers to cement products and particularly to asbestos-cement products for the prevention of blooming or efflorescence caused by the leaching out of small amounts of free calcium oxide present in the cement product by water in an accelerated curing process known as steam autoclaving or even by water present in the article during manufacture. Polymers of styrene used for this purpose have the disadvantage of discoloration because of exposure outdoors to ultraviolet light and weathering influences. They also have a high rate of chalking. Polymers of vinyl acetate are subject to hydrolysis by the alkalinity of the cement product and, therefore, fail in the autoclave or, in cases of natural aging conditions, tend to deteriorate with time. Polymers composed largely of ethyl acrylate and methyl acrylate are likewise subject to such hydrolysis although not to so great an extent as the vinyl acetate polymers. While such copolymers might perform satisfactorily on shingles prepared by the so-called Norton dry process, where only a stoichiometric amount of water is added to the cement/asbestos slurry, they fail on products made by the Hatschek wet method employing excess water.

Polymers composed largely of methyl methacrylate, such as from 85% by weight up to 100%, provide substantially complete resistance to hydrolysis, regardless of the process used in the manufacture of the shingles even though the polymer may contain as much as 15% by weight of a lower alkyl acrylate or vinyl acetate which would ordinarily be subject to hydrolysis. However, unmodified aqueous dispersions of such copolymers do not form continuous films unless very high temperatures are employed. Attainment of such temperatures is sometimes impractical because of economic considerations and frequently impossible because of handling difficulties. Moreover, the boiling temperature of water imposes an upper thermal limit which cannot be exceeded unless the coating is effected in a pressure chamber in which the pressure is adequate to prevent boiling of the coating composition during the drying thereof.

The use of plasticizers, such as dibutyl phthalate (boiling point, 340° C.), butyl benzyl phthalate (B.P., 380° C.), or aryloxyalkyl ethers (B.P., above 350° C.), disclosed in U.S. Patent 2,286,767, has been known to be helpful in obtaining continuous films with such methyl methacrylate polymer compositions at reasonable temperatures. These compounds, however, have a major limitation in the fact that their low volatility (high boiling point) leads to their retention in the polymer film under ordinary drying conditions, which is reflected in a high degree of film plasticity. This condition leads to major difficulties which in many cases prohibit the use of these plasticized systems due to high reject rates on production lines.

The thermoplastic coatings obtained using polymers predominantly of methyl methacrylate have many desirable qualities but copolymers of methyl methacrylate and ethyl acrylate develop a pronounced sensitivity to water on exposure to sunlight or other source of ultraviolet light. Also it has been discovered that, although the coatings are initially insoluble in water, they have the disadvantage of becoming mottled in appearance or, in some aggravated cases, white and dusty when moistened, as in a rain. These changes in appearance are aggravated or accelerated by exposure to ultraviolet light. It appears, in some serious instances, that the continuity of the polymer film in the coating is disrupted and, especially in the case of polymers containing higher proportions of methyl methacrylate, such as 85% or more, because the minimum temperature of film formation of the polymer as it exists in unplasticized condition in the final coating is above the temperature of the surrounding atmosphere even in hot climates, the polymer particles do not recoalesce to a continuous condition on drying under ambient conditions. Whitening is objectionable not only in clear coatings but also in colored coatings especially of dark color.

In accordance with the present invention, there is provided a coated article of manufacture, such as an asbestos-cement composition having on its surface a thermoplastic coating of a linear emulsion polymer of 60 to 90% by weight of methyl methacrylate, 10 to 40% by weight of vinyltoluene, and 0 to 20% by weight of other monoethylenically unsaturated comonomers which may include up to 2% by weight of a comonomer imparting hydrophilicity to the copolymer. Preferred copolymers are those of about 1 to 10% by weight of a $(C_1-C_4)$-alkyl acrylate, such as ethyl acrylate, about ¼ to 2% by weight of an acid selected from the group consisting of acrylic acid, methacrylic acid, and itaconic acid, about 70 to 89% by weight of methyl methacrylate, and about 10 to 20% by vinyltoluene. The molecular weight may vary widely such as from 100,000 to several million viscosity average.

The present invention may generally be represented by the following flow sheet diagram:

Coat an article with an aqueous dispersion containing
    (a)  a linear polymer of
        (1) 60 to 90% methyl methacrylate
        (2) 10 to 40% vinyltoluene
        (3) Not over 20% of other monomer, not over 2% imparting hydrophilicity
    (b)  20 to 60% by weight (on polymer weight) of a water-insoluble organic solvent for the polymer boiling in the range of 150° to 255° C.

Drying and heating coated article at 150° to 400° C. to remove solvent.

The invention also provides a process of preparing coated articles involving the application thereto of an aqueous dispersion of a linear emulsion copolymer as defined herein and about 20 to 60% by weight, based on the weight of the polymer, of a water-soluble or water-insoluble organic solvent for the polymer having a boiling point in the range from 150° to 255° C., the drying of the composition applied to the article in situ thereon, and then the baking, either during or after the drying, of the composition to volatilize the organic solvent substantially completely. The baking may be effected for an appropriate time at a temperature in the range of 150° to 400° C.

The invention further provides a process for preparing a coated cement product, characterized by applying to either (1) a formed but uncured cement composition or (2) an entirely cured cement composition a coating of an aqueous dispersion comprising (a) a linear polymer as defined above, and (b) 20 to 60% by weight, based on the weight of the polymer, of a water-soluble or water-insoluble organic solvent for the polymer having a boiling point in the range from 150° to 255° C. When the coating composition is applied to the completely cured composition, the coating is baked as in the case of coating any other article. When the composition is applied to an uncured or only partially cured asbestos-cement composition, it is dried in any suitable manner, as in ambient air or by elevated temperatures and then the coated sheets or shingles may be stacked for curing in an autoclave or even at temperatures of 150° to 180° C. with or without steam. During the curing of the asbestos-cement composition, the coating is baked simultaneously, resulting in volatilization of the organic solvent.

The present invention provides an aqueous dispersion of a polymer for the coating of all sorts of articles including cement products so as to obtain a durable coating which prevents (1) blooming under autoclaving as well as under natural aging or weathering conditions as well as (2) the development of whiteness or discontinuity when exposed to UV light and rain. Furthermore, the aqueous dispersion is of such character that it can be applied to finished asbestos-cement shingles or to uncured shingles and then stacked for drying or for curing either at normal room temperatures or at elevated temperatures and high huimidity such as would be employed in an autoclaving process. The coated products are highly resistant to the effect of water, to ultraviolet light, and to the penetration of moisture; they are less subject to staining by dirt or by water-borne stains; and they have an outstanding glossy appearance.

The vinyltoluene used may be o-, m-, or p-methylstyrene, or a mixture thereof is used. Besides the vinyltoluene and methyl methacrylate, the polymer may contain up to 20% by weight of other comonomers and particularly of esters of acrylic acid with an alcohol having 1 to 18 carbons atoms, and preferably 1 to 4 carbon atoms, such as methyl, ethyl, or butyl acrylate. A small proportion from about ¼% to 2% of the polymer may be formed of monomers imparting hydrophilic characteristics to the polymer such as acrylic acid, methacrylic acid, itaconic acid, acrylamide, methacrylamide, β-hydroxyethyl acrylate, β-hydroxyethyl vinyl ether, β-aminoethyl acrylate, β-N,N-dimethylaminoethyl acrylate, and the like.

The polymer dispersions may be prepared by emulsifying in water at a temperature from 0° to 100° C., and preferably from 10° to 60° C., the mixture of methyl methacrylate and vinyltoluene with one or more other monomers such as those mentioned hereinabove to make the total of monomers up to 100%. Any conventional emulsifying agent may be employed either of anionic, nonionic, or cationic character, such as sodium lauryl sulfate or ethylene oxide condensates of ($C_8$–$C_{18}$)-alkylphenols, e.g., t-octylphenol (containing from 8 to 50 oxyethylene units per molecule), the amounts being from about ½% to 6% by weight of the monomers. The polymerization is then effected at any temperature in the range specified above by the introduction of free-radical initiators such as azo catalysts and the like. Peroxidic free-radical catalysts, particularly catalytic systems of the redox type, are recommended, such as a combination of potassium persulfate and sodium metabisulfite. Other suitable peroxidic agents include the "persalts" such as the alkali metal and ammonium persulfates and perborates, hydrogen peroxide, organic hydroperoxides, such as tert-butyl hydroperoxide and cumene hydroperoxide, and esters such as tert-butyl perbenzoate. In this way, it is possible to prepare dispersions which contain as little as 1% or as much as 60% of the resinous copolymer on a weight basis. It is, however, more practical—hence preferred—to produce dispersions which contain about 30 to 50% resin-solids and which can be diluted as desired for application to the asbestos-cement compositions.

In the practice of the invention, the aqueous dispersions of the vinyltoluene/methyl methacrylate polymers are modified by the incorporation of about 20 to 60% by weight, based on the weight of the polymer, of a water-soluble or a water-insoluble solvent for the polymer with a boiling point (at 760 mm. Hg) in the range of from 150° to 255° C. and preferably in the range of 170° to 215° C. The lower limit of the boiling range of the solvent is such that the modifier will not leave the polymer particles before sufficient evaporation of water has taken place to effect particle compaction to a point where deformation of the polymeric particles can take place and result in coalescence into a continuous film. On the other hand, the upper limit of the boiling range is such that, once film continuity has been achieved, the solvent leaves the film readily so as to facilitate a rapid development of film hardness.

The preferred solvents are those having the formula $$R^0O(C_2H_4O)_nH \qquad (I)$$

where $R^0$ is selected from the group consisting of phenyl and ($C_1$–$C_6$)-alkyl groups and $n$ is an integer having a value from 1 to 2.

Examples of these solvents (and their boiling points or ranges) are β-(phenyloxy)-ethanol (245.2° C.), β-(butoxy) ethanol (170.6° C.), β-(2-ethylbutoxy)-ethanol (187–207° C.), the monomethyl ether of diethylene glycol (193.2° C.), the monoethyl ether of diethylene glycol (201.9° C.), and the monobutyl ether of diethylene glycol (231.2° C.).

Another somewhat less preferred group of solvents are those having the formula

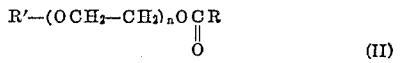

$$R'-(OCH_2-CH_2)_nO\overset{\text{O}}{\underset{\|}{C}}R \qquad (II)$$

where R is an alkyl group of 1 to 3 carbon atoms or a phenyl group, $n$ is a number from 1 to 2, and R' is an alkyl group of 1 to 4 carbon atoms.

Examples of these solvents (and their boiling points) are 2-ethoxyethyl acetate (156° C.), 2-butoxyethyl acetate (191° C.), 2-(2-ethoxyethoxy)ethyl acetate (217° C.), 2-(2-butoxyethoxy)ethyl acetate (246° C.), 2-ethoxyethyl propionate, 2-ethoxyethyl butyrate (188° C.), 2-methoxyethyl propionate (159° C.), 2-methoxyethyl butyrate (177° C.), and 2-methoxyethyl benzoate (252° C.).

Other solvents that are suitable (and their boiling points) are 3-ethoxypropyl acetate, 3-ethoxypropyl propionate, benzyl alcohol (205° C.), benzyl acetate (213° C.), benzyl propionate (220° C.), benzyl butyrate (240° C.), butyl lactate (188° C.), ethyl benzoate (211° C.), isophorone (215° C.), methyl hexyl ketone (173.5° C.), amyl hexyl ketone (168° C.), methyl phenyl ketone, 202.3° C.), dimethylformamide (153° C.), and bis-(β-ethoxyethyl)ether (boiling range of 180° to 190° C.).

The solvent mentioned hereinabove is preferably introduced into the aqueous dispersion after the completion of polymerization. However, if desired, it may be introduced either before or during the polymerization. The amount of solvent may vary widely. At least sufficient amount should be employed to cause the dispersion to form continuous films on drying at temperatures below 100° C. Sufficient solvent may be employed to cause coalescence or film-formation merely on drying at normal room temperatures such as at 15° or 20° C. Obviously, the proportion of the solvent employed will depend upon the minimum temperature of film-formation desired and the particular polymer in the aqueous dispersion.

Besides introducing the solvent, there may be introduced into the dispersion pigments or dyes to modify the coating when a clear, colorless coating is not desired.

The dispersion is applied to the articles, such as asbestos-cement compositions, by conventional means, such as spraying, flooding, etc. While it can be applied either before or after any compressing and/or embossing treatment of the compositions, it is preferred to do so after the composition has been compressed and has been subjected to a heat treatment, as, for example, by passage through an oven or under a bank of radiant heaters. Alternatively, compositions which have had no heat treatment can be coated and then heated. In the case of asbestos-cement compositions, it is essential that the applied coatings of the dispersions dry rapidly to tack-free condition before the coated compositions are stacked for curing.

A description of one mode of operation when application is made to partially cured cement compositions is as follows: The freshly formed wet, plastic asbestos-cement sheet, colored or uncolored, passes from the forming part of the machine on a conveyor through a gas-fired, radiant heat oven. This raises the temperature of the surface of the sheet to approximately 140° to 150° F. and reduces the moisture content to about 20%. The sheet, still plastic and non-rigid, is then textured by contact with an embossing roll. Immediately following this, it is sprayed with a dispersion at a solids-content of about 10 to 20%, although the solids-content is not critical and is merely adjusted to permit easy application of a film having adequate thickness. A deposit which is equivalent to two grams or more—and preferably from two to three grams—of resinous solids per square foot is applied. The residual heat in the sheet is sufficient to flash-dry the dispersion to the point where a clear, tack-free, non-blocking film of resin is deposited. The sheets can then be cut to the desired size and shape. At this stage, the coated asbestos-cement compositions are so soft and plastic that they can be deformed by manual pinching, but they are also tack-free. They are next removed from the conveyor and are stacked for curing.

The weight or pressure on the sheets or layers of the composition in the lower portions of the piles is of necessity very high but the coatings of resin do not become tacky or adherent to other surfaces. Rather, they maintain excellent adhesion to only the surface on which they were applied.

The curing of shingles may be carried out under atmospheric conditions during which the sheets are subjected to temperatures no higher than obtainable from the exotherm of the hydration of cement, but in this case a baking step should be provided to remove the organic solvent from the coatings.

An accelerated curing cycle may also be used in order to speed up the hydration of the cement to a point where a complete or nearly complete hydration is accomplished in a period of 6 to 16 hours. Under the conditions of autoclaving, the coated shingles, possibly after several days of natural aging, are placed in a high pressure chamber known as the autoclave and, after sealing off this container, steam is pumped into the autoclave to maintain the temperature therein between 150° and 180° C. Under such hot and moist conditions, blooming on the surface of the shingles becomes very critical and it is virtually impossible to cure uncoated shingles without encountering this difficulty. The coating prepared in accordance with this invention eliminates this problem. At the end of the curing cycle, the sheets are removed from the autoclave and, if not trimmed prior to autoclaving, may then be cut and packaged for shipment.

The coating compositions and processes of the present invention may be applied to any solid article, such as of wood, glass, porcelain, ceramic articles, glazed or unglazed, concrete blocks, bricks, stone, metals, especially aluminum and its alloys, steel, stainless steels, and copper and its alloys. In all such applications, the coatings are baked as described to remove volatile solvent. The coatings do not become white or discontinuous on exposure to water and they are remarkably durable to weathering.

The cement products obtained in accordance with the present invention have attractive sheen and appearance. The coated products retain their attractive appearance over long periods of time and show no efflorescence, no discoloration in spite of the usual exposure to the rays of the sun, and are free from deterioration by hydrolytic action.

In the following examples which are illustrative of the present invention, the parts and percentages are by weight unless otherwise indicated.

*Example 1*

A sheet of asbestos-cement composition was prepared on a conventional cylinder-type forming machine. The wet sheet was 5/32 of an inch in thickness and was made up of several laminations and a veneer of approximately 0.015 inch thickness. The base contained on a solids-basis: 80% Portland cement and 20% asbestos fiber. The veneer contained on a solids-basis: 60% Portland cement, 18% asbestos fibers, and 22% mineral oxide pigments and extenders. The composite sheet, containing approximately 20% moisture-content, was run under a bank of radiant heaters which reduced the moisture-content to about 18%. The sheet was then textured by means of embossing rolls, after which it was sprayed while at about 140° F. with an aqueous dispersion containing 20% by weight of a copolymer of about 69.5% of methyl methacrylate, about 20% vinyltoluene, about 10% of ethyl acrylate, and about ½% of methacrylic acid, about 3%, of the weight of copolymer, of sodium lauryl sulfate, and 40% by weight, based on the weight of the copolymer, of 2-butoxyethyl acetate. The spraying equipment was adjusted to the speed of the machine so that the amount of dispersion applied was such as to deposit about 2 to 3 grams of polymer, on a dry basis, per square foot of the asbestos-cement sheet. The coated sheets were passed through a short drying section, during which time the moisture content of the resin film was reduced and a substantial portion of the organic solvent was also removed, leaving a continuous tack-free film of the polymer on the sheets. The sheet was then cut into individual sections or units measuring 2 ft. by 4 ft. and these were immediately stacked to a height of two to three feet on wooden pallets. At this stage, the sheets were soft and could be deformed or ruptured by ordinary pinching with thumb and finger. They were not rigid but were so plastic that they conformed to the shape of a surface on which they were placed. The units were piled one on another and were stored in a warehouse at ambient temperature for three days. The individual sheets were then removed from the pallets, were punched and trimmed to final dimensions, and were packaged. In no instance was there evidence of blocking. That is, the sheets which had been coated and stacked in the plastic condition gave no evidence of adhesion, one to another.

*Example 2*

The procedure of Example 1 is repeated except that the cut units were piled one on another and, instead of being stored in a warehouse at ambient temperature for three days, the piled units were introduced into an autoclave wherein they were heated to about 170° C. for a period of eight hours. During the autoclaving, the solvent was substantially completely removed. On removal from the autoclave, it was found that the sheets did not block together and the asbestos-cement units carried uniform, clear, glossy films of the polymer.

*Example 3*

The procedure of Example 2 was repeated except that the polymer was formed of 85% of methyl methacrylate and 15% by weight of vinyltoluene and the solvent employed was isophorone.

Example 4

The procedure of Example 2 was repeated except that benzyl alcohol was used in place of butoxyethyl acetate as solvent for the acrylic copolymer.

Example 5

The procedure of Example 2 was repeated except that 2-(2-butoxyethoxy)ethyl acetate was used in place of butoxyethyl acetate as solvent for the acrylic copolymer.

Example 6

Examples 1 and 2 were repeated except that the 2-butoxyethyl acetate was replaced by β-(butoxy)-ethanol, the sodium lauryl sulfate was replaced by an ethylene oxide condensate of t-octylphenol, and the concentration of copolymer in the aqueous dispersion was 30%.

Example 7

Example 6 was repeated except that the solvent used was methyl hexyl ketone.

Example 8

Example 6 was repeated except that the solvent used was dimethylformamide.

Example 9

Example 6 was repeated except that the solvent used was the monomethyl ether of diethylene glycol.

Example 10

Examples 1 and 2 were repeated with similar benefits using a copolymer of 79.5% methyl methacrylate, 10% vinyltoluene, 10% methyl acrylate, and about 0.5% acrylic acid.

Example 11

Examples 1 and 2 were repeated using a copolymer of 70% methyl methacrylate, 20% vinyltoluene, and 10% ethyl acrylate, and again using a copolymer of 80% methyl methacrylate, 10% vinyltoluene, and 10% butyl acrylate.

Example 12

Aluminum siding panels and pressed wood composition boards were sprayed with an aqueous dispersion containing 20% by weight of a copolymer of about 69.5% of methyl methacrylate, about 20% vinyltoluene, about 10% of ethyl acrylate, and about ½% methacrylic acid, about 3%, on the weight of copolymer, of sodium lauryl sulfate, and 40% by weight, based on the weight of the copolymer, of β-(butoxy)-ethanol. The coated sheets were then passed through a drying tunnel at 95° to 105° C.

Example 13

A coating composition was prepared of the following:

| | Parts |
|---|---|
| Rutile titanium dioxide | 150.0 |
| Water | 65.0 |
| Sodium salt of a 1:1 mole ratio copolymer of maleic anhydride and diisobutylene (25% con.) | 3.0 |
| Defoamer | 1.0 |
| Aqueous copolymer dispersion containing 35.5% of the copolymer of Example 12 | 693.0 |
| Total | 912.0 |

The pigment volume content was 15%.

The composition was applied to asbestos-cement shingles and siding by the procedures of Examples 1 and 2 and to aluminum siding panels by the procedure of Example 12.

We claim:

1. A process for preparing a coated product which comprises applying to a formed article a coating of an aqueous dispersion comprising (a) a linear polymer selected from the group consisting of linear copolymers of 60 to 90% by weight of methyl methacrylate and 10 to 40% by weight of vinyltoluene, and linear copolymers of at least 60% by weight of methyl methacrylate, at least 10% by weight of vinyltoluene and up to 20% by weight of at least one other monoethylenically unsaturated comonomer, the weight of any comonomer imparting hydrophilicity to the copolymer being not over 2%, and (b) 20 to 60% by weight, based on the weight of the polymer, of a solvent, selected from the group consisting of water-soluble and water-insoluble organic solvents, for the polymer having a boiling point in the range from 150° to 255° C., drying and heating the coated article at a temperature of 150° to 400° C. to remove the organic solvent.

2. A process according to claim 1, wherein the component of the polymer consisting of a comonomer imparting hydrophilicity to the copolymer is an acid selected from the group consisting of acrylic acid, methacrylic acid, and itaconic acid.

3. A process according to claim 1, wherein said component (b) of the aqueous composition is selected from the group consisting of bis-(β-ethoxyethyl)ether, isophorone, benzyl alcohol, methyl hexyl ketone, amyl hexyl ketone, methyl phenyl ketone, and dimethylformamide.

4. A process according to claim 1, wherein the component of the polymer consisting of monoethylenically unsaturated comonomers is an acrylate derived from an alcohol having 1 to 18 carbon atoms.

5. A process according to claim 4, wherein said acrylate is selected from the group consisting of methyl, ethyl, and butyl acrylates.

6. A process according to claim 1, wherein said component (b) of the aqueous dispersion is a compound having the formula

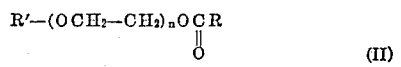

where R is selected from the group consisting of alkyl groups of 1 to 3 carbon atoms and a phenyl group, $n$ is an integer having a value of 1 or 2, and R' is an alkyl group of 1 to 4 carbon atoms.

7. A process according to claim 6, wherein said compound of Formula II is selected from the group consisting of 2-butoxyethyl acetate, isophorone, benzyl alcohol, and 2-(2-butoxyethoxy)ethyl acetate.

8. A process according to claim 1, wherein said article is a cement composition which consists of asbestos and cement and is in a wet, soft, and plastic condition and at a temperature of about 55° to 65° C., said component (a) of the aqueous dispersion is a polymer prepared by emulsion polymerization, and the coated cement compositions are dried at a temperature of 150° to 180° C. while stacked on one another.

9. A process according to claim 8, wherein said component (b) of the aqueous composition is a compound having the formula:

where $R^0$ is selected from the group consisting of phenyl and alkyl groups of 1 to 6 carbon atoms and $n$ is an integer having a value of 1 or 2.

10. A process according to claim 9, characterized by the fact that said compound of Formula I is selected from the group consisting of β-(phenyloxy)-ethanol, β-(butoxy)-ethanol, β-(2-ethylbutoxy)-ethanol, the monomethyl, monoethyl, and the monobutyl ethers of diethylene glycol.

11. As an article of manufacture, a solid substrate carrying a thermoplastic coating, in adhered relation to its surface, of a linear polymer selected from the group consisting of linear copolymers of 60 to 90° by weight of methyl methacrylate and 10 to 40% by weight of vinyltoluene, and linear copolymers of at least 60% by weight of methyl methacrylate, at least 10% by weight of vinyltoluene and up to 20% by weight of at least another copolymerizable monoethylenically unsaturated comonomer the amount of any monomer imparting hydrophilicity to the copolymer being not over 2% by weight.

12. As an article of manufacture, a rigid substrate carrying a thermoplastic coating, in adhered relation to its surface, of a linear polymer selected from the group consisting of linear copolymers of 60 to 90% by weight of methyl methacrylate and 10 to 40% by weight of vinyltoluene and linear copolymers of at least 60% by weight of methyl methacrylate, at least 10% by weight of vinyltoluene and up to 20% by weight of at least another copolymerizable monoethylenically unsaturated comonomer, the amount of any monomer imparting hydrophilicity to the copolymer being not over 2% by weight.

13. As an article of manufacture, an asbestos-cement composition having its surface coated with a thermoplastic linear polymer selected from the group consisting of linear copolymers of 60 to 90% by weight of methyl methacrylate and 10 to 40% by weight of vinyltoluene, and linear copolymers of at least 60% by weight of methyl methacrylate, at least 10% by weight of vinyltoluene and up to 20% by weight of at least another copolymerizable monoethylenically unsaturated comonomer, the amount of any monomer imparting hydrophilicity to the copolymer being not over 2% by weight.

14. As an article of manufacture, a solid substrate carrying a thermoplastic coating, in adhered relation to its surface, of a copolymer of about 1 to 10% by weight of a ($C_1$–$C_4$)-alkyl acrylate, about ¼ to 2% by weight of an acid selected from the group consisting of acrylic acid, methacrylic acid, and itaconic acid, about 70 to 89% by weight of methyl methacrylate, and about 10 to 20% by weight of vinyltoluene.

15. As an article of manufacture, a solid substrate carrying a thermoplastic coating, in adhered relation to its surface, of a copolymer of about 1 to 10% by weight of ethyl acrylate, about ¼ to 2% by weight of methacrylic acid, about 70 to 89% by weight of methyl methacrylate, and about 10 to 20% by weight of vinyltoluene.

References Cited in the file of this patent

UNITED STATES PATENTS

| | | |
|---|---|---|
| 2,716,619 | Jobbins et al. | Aug. 30, 1955 |
| 2,750,302 | Camarda et al. | June 12, 1956 |
| 2,901,454 | Stewart | Aug. 25, 1959 |
| 2,955,958 | Brown | Oct. 11, 1960 |
| 2,972,592 | Brown et al. | Feb. 21, 1961 |

FOREIGN PATENTS

| | | |
|---|---|---|
| 749,801 | Great Britain | May 30, 1956 |
| 1,088,405 | Germany | Sept. 1, 1960 |